(12) United States Patent
Watts

(10) Patent No.: US 11,312,085 B2
(45) Date of Patent: *Apr. 26, 2022

(54) HIGH RATE ULTRASONIC SEALER

(71) Applicant: Campbell Soup Company, Camden, NJ (US)

(72) Inventor: Mark Robert Watts, Marlton, NJ (US)

(73) Assignee: Campbell Soup Company, Camden, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 17/170,432

(22) Filed: Feb. 8, 2021

(65) Prior Publication Data

US 2021/0323241 A1     Oct. 21, 2021

Related U.S. Application Data

(63) Continuation of application No. 15/989,842, filed on May 25, 2018, now Pat. No. 10,913,211.

(Continued)

(51) Int. Cl.
  *B32B 7/00*  (2019.01)
  *B29C 65/08*  (2006.01)
  (Continued)

(52) U.S. Cl.
  CPC ............ *B29C 65/087* (2013.01); *B29C 65/08* (2013.01); *B29C 65/78* (2013.01);
  (Continued)

(58) Field of Classification Search
  USPC ...................................................... 156/73.1
  See application file for complete search history.

(56) References Cited

U.S. PATENT DOCUMENTS

| 3,458,380 A | 7/1969 | Kipp |
| 3,494,817 A | 2/1970 | Whitecar |

(Continued)

FOREIGN PATENT DOCUMENTS

| CN | 101011775 | 8/2007 |
| CN | 204075496 | 1/2015 |

(Continued)

OTHER PUBLICATIONS

File History for U.S. Appl. No. 15/989,842 downloaded Mar. 10, 2021 (214 pages).

(Continued)

*Primary Examiner* — James D Sells
(74) *Attorney, Agent, or Firm* — Pauly, DeVries Smith & Deffner LLC

(57) ABSTRACT

Embodiments herein include a system for joining components. The system can include a rotating base platform, a plurality of receptacles mounted to the base platform, and a rotating sonotrode platform. A plurality of sonotrodes are mounted to the sonotrode platform. Each sonotrode can correspond to a receptacle. Each sonotrode can move in a reciprocating motion between a release position distant from a corresponding receptacle and a compressing position proximal to the corresponding receptacle. The compressing position occurs at a first angular position of the sonotrode platform. Each sonotrode is energized at the compressing position.

13 Claims, 8 Drawing Sheets

Related U.S. Application Data

(60) Provisional application No. 62/512,287, filed on May 30, 2017.

(51) Int. Cl.
   *B29C 65/00* (2006.01)
   *B29C 65/78* (2006.01)
   *B65B 51/22* (2006.01)
   *B65B 7/28* (2006.01)
   *B29L 31/00* (2006.01)

(52) U.S. Cl.
   CPC ...... *B29C 65/7867* (2013.01); *B29C 65/7879* (2013.01); *B29C 65/7885* (2013.01); *B29C 65/7897* (2013.01); *B29C 66/112* (2013.01); *B29C 66/131* (2013.01); *B29C 66/3022* (2013.01); *B29C 66/30221* (2013.01); *B29C 66/53461* (2013.01); *B29C 66/73921* (2013.01); *B29C 66/8242* (2013.01); *B29C 66/8322* (2013.01); *B29C 66/83521* (2013.01); *B29C 66/83523* (2013.01); *B29C 66/83541* (2013.01); *B29C 66/849* (2013.01); *B29C 66/9161* (2013.01); *B29C 66/9221* (2013.01); *B29C 66/9231* (2013.01); *B29C 66/961* (2013.01); *B65B 7/2878* (2013.01); *B65B 51/225* (2013.01); *B29C 66/712* (2013.01); *B29C 66/919* (2013.01); *B29C 66/929* (2013.01); *B29C 66/92443* (2013.01); *B29C 66/92611* (2013.01); *B29C 66/92921* (2013.01); *B29C 66/949* (2013.01); *B29C 66/9513* (2013.01); *B29C 66/9517* (2013.01); *B29L 2031/7164* (2013.01)

(56) References Cited

U.S. PATENT DOCUMENTS

| | | |
|---|---|---|
| 3,620,875 A | 11/1971 | Guglielmo et al. |
| 3,956,975 A | 5/1976 | Egleston et al. |
| 4,072,089 A | 2/1978 | Bosche |
| 4,207,989 A | 6/1980 | Ingemann |
| 4,221,467 A | 9/1980 | Imai |
| 4,332,332 A | 6/1982 | Ingemann |
| 4,360,121 A | 11/1982 | Helms |
| 4,411,720 A | 10/1983 | Sager |
| 4,434,907 A | 3/1984 | Ingemann |
| 4,529,100 A | 7/1985 | Ingemann |
| 4,758,293 A | 7/1988 | Samida |
| 4,948,441 A | 8/1990 | Peck |
| 5,027,999 A | 7/1991 | Kuecherer |
| 5,040,357 A | 8/1991 | Ingemann et al. |
| 5,069,355 A | 12/1991 | Matuszak |
| 5,145,085 A | 9/1992 | Yost |
| 5,246,134 A | 9/1993 | Roth et al. |
| 5,304,265 A | 4/1994 | Keeler |
| 5,328,045 A | 7/1994 | Yoshida |
| 5,345,747 A | 9/1994 | Raque et al. |
| 5,484,374 A | 1/1996 | Bachner et al. |
| 5,511,680 A | 4/1996 | Kinne |
| 5,575,884 A | 11/1996 | Annehed et al. |
| 5,606,844 A | 3/1997 | Takagaki et al. |
| 5,623,816 A | 4/1997 | Edwards et al. |
| 5,634,567 A | 6/1997 | Hekal |
| 5,645,681 A | 7/1997 | Gopalakrishna et al. |
| 5,647,501 A | 7/1997 | Helms |
| 5,692,635 A | 12/1997 | Farrell et al. |
| 5,697,514 A | 12/1997 | Hekal |
| 5,983,599 A | 11/1999 | Krueger |
| 6,082,920 A | 7/2000 | Furukawa |
| 6,192,660 B1 | 2/2001 | Moriyama et al. |
| 6,193,094 B1 | 2/2001 | Diamond et al. |
| 6,427,862 B1 | 8/2002 | Hsu |
| 6,460,720 B1 | 10/2002 | Massey et al. |
| 6,471,084 B2 | 10/2002 | Erb |
| 6,508,375 B1 | 1/2003 | Krall |
| 6,544,613 B1 | 4/2003 | Varadarajan |
| 6,605,178 B1 | 8/2003 | Shinohara et al. |
| 6,688,486 B2 | 2/2004 | Diamond et al. |
| 6,722,102 B1 | 4/2004 | Pape et al. |
| 6,802,920 B2 | 10/2004 | Shinohara et al. |
| 7,055,713 B2 | 6/2006 | Rea et al. |
| 7,383,865 B2 | 6/2008 | Umebayashi et al. |
| 7,644,746 B2 | 1/2010 | Soerensen et al. |
| 7,766,067 B2 | 8/2010 | Voss |
| 7,766,183 B2 | 8/2010 | Wallis et al. |
| 7,892,375 B2 | 2/2011 | Blanchard et al. |
| 8,021,504 B2 | 9/2011 | Gabler et al. |
| 8,419,021 B2 | 4/2013 | Mellander |
| 8,720,516 B2 | 5/2014 | Klinstein et al. |
| 8,943,784 B2 | 2/2015 | Iseki et al. |
| 8,998,030 B2 | 4/2015 | Minnette et al. |
| 9,056,704 B2 | 6/2015 | Carvin et al. |
| 9,149,980 B2 | 10/2015 | Cham et al. |
| 9,340,344 B2 | 5/2016 | Tamaro et al. |
| 9,474,397 B2 | 10/2016 | Minnette |
| 9,676,504 B2 | 6/2017 | Minnette et al. |
| 10,913,211 B2 * | 2/2021 | Watts ................. B29C 65/7897 |
| 2001/0018390 A1 | 8/2001 | Heide |
| 2004/0031798 A1 | 2/2004 | Fox et al. |
| 2005/0061848 A1 | 3/2005 | Johansen |
| 2005/0274092 A1 | 12/2005 | Rohret et al. |
| 2006/0073958 A1 | 4/2006 | Bachner et al. |
| 2006/0213952 A1 | 9/2006 | Johansen |
| 2007/0023433 A1 | 2/2007 | Vahavihu |
| 2007/0251643 A1 | 11/2007 | Umebayashi et al. |
| 2009/0289528 A1 | 11/2009 | Voss et al. |
| 2009/0302040 A1 | 12/2009 | Fox et al. |
| 2010/0326586 A1 | 12/2010 | Moeglich |
| 2012/0037271 A1 | 2/2012 | Davidson et al. |
| 2012/0234835 A1 | 9/2012 | Minnette |
| 2012/0267035 A1 | 10/2012 | Maiorino et al. |
| 2013/0008904 A1 | 1/2013 | Minnette et al. |
| 2013/0074455 A1 | 3/2013 | Gillblad |
| 2014/0166682 A1 | 6/2014 | Huffer |
| 2015/0114923 A1 | 4/2015 | Horz |
| 2015/0129110 A1 | 5/2015 | Klinstein et al. |
| 2015/0136780 A1 | 5/2015 | Tamaro et al. |
| 2016/0052658 A1 | 2/2016 | Solenthaler |
| 2016/0067912 A1 | 3/2016 | Schneider et al. |
| 2016/0090205 A1 | 3/2016 | Py et al. |
| 2016/0100990 A1 | 4/2016 | Fujita et al. |
| 2016/0107377 A1 | 4/2016 | Fujita et al. |
| 2016/0221695 A1 | 8/2016 | Davidson et al. |
| 2017/0027762 A1 | 2/2017 | Fujita et al. |
| 2017/0027763 A1 | 2/2017 | Fujita et al. |
| 2018/0141692 A1 | 5/2018 | Hauck et al. |
| 2018/0345587 A1 | 12/2018 | Watts |
| 2018/0346221 A1 | 12/2018 | Watts |

FOREIGN PATENT DOCUMENTS

| | | |
|---|---|---|
| DE | 1427329 | 1/1969 |
| DE | 102004057479 | 5/2006 |
| DE | 102006043605 | 3/2008 |
| EP | 0711626 | 5/1996 |
| EP | 1466829 | 10/2004 |
| EP | 1604901 | 12/2005 |
| EP | 1918219 | 5/2008 |
| EP | 2073942 | 7/2009 |
| EP | 1503940 | 9/2009 |
| EP | 2106336 | 10/2009 |
| EP | 2284085 | 2/2011 |
| EP | 2998104 | 3/2016 |
| EP | 3068604 | 9/2016 |
| GB | 2127587 | 4/1984 |
| GB | 2136783 | 9/1984 |
| JP | 2003131347 | 5/2003 |
| JP | 2007030236 | 2/2007 |
| JP | 4216637 | 11/2008 |
| JP | 3148021 | 1/2009 |
| JP | 4522713 | 6/2010 |
| JP | 4639479 | 12/2010 |

(56) References Cited

FOREIGN PATENT DOCUMENTS

| | | |
|---|---|---|
| JP | 2012505124 | 3/2012 |
| JP | 2016022995 | 2/2016 |
| WO | 03086881 | 10/2003 |
| WO | 2008031823 | 3/2008 |
| WO | 2008037256 | 4/2008 |
| WO | 2008068281 | 6/2008 |
| WO | 2011060971 | 5/2011 |
| WO | 2011064337 | 6/2011 |
| WO | 2013006858 | 1/2013 |
| WO | 2014059290 | 4/2014 |
| WO | 2015073126 | 5/2015 |
| WO | 2018222565 | 12/2018 |
| WO | 2018222566 | 12/2018 |

OTHER PUBLICATIONS

File History for U.S. Appl. No. 15/989,857 downloaded Mar. 10, 2021 (281 pages).
"International Preliminary Reporton Patentability," for PCT Application No. PCT/US2018/043832 dated Dec. 12, 2019 (7 pages).
"International Preliminary Reporton Patentability," for PCT Application No. PCT/US2019/034831 dated Dec. 12, 2019 (11 pages).
"International Search Report and Written Opinion," for PCT Application No. PCT/US2018/034831 dated Aug. 1, 2018 (14 pages).
"International Search Report and Written Opinion," for PCT Application No. PCT/US2018/034832 dated Jul. 25, 2018 (12 pages).
"Final Office Action," for U.S. Appl. No. 15/989,857 dated May 24, 2021 (13 pages).

* cited by examiner

HIGH RATE ULTRASONIC SEALER

This application is a continuation of U.S. patent application Ser. No. 15/989,842, filed May 25, 2018, which claims the benefit of U.S. Provisional Application No. 62/512,287, filed May 30, 2017, the content of which is herein incorporated by reference in its entirety.

FIELD

Embodiments herein relate to sealing filled food and beverage containers. More specifically, embodiments herein relate to systems and methods for ultrasonically sealing filled food containers.

BACKGROUND

As a part of many food manufacturing processes, containers are filled with a food product and then sealed with a sealing structure or film. In some food manufacturing processes, ultrasonic devices are used to ultrasonically join a food container with a sealing structure. Specialized application equipment can be used to ultrasonically seal filled food containers.

SUMMARY

Embodiments herein include a system for joining components. The system includes a rotating base platform, a plurality of receptacles mounted to the base platform, and a rotating sonotrode platform. The rotating sonotrode platform rotates at the same velocity as the base platform. A plurality of sonotrodes are mounted to the sonotrode platform. Each sonotrode corresponds to a receptacle. Each sonotrode moves in a reciprocating motion between a release position distant from a corresponding receptacle and a compressing position proximal to the corresponding receptacle. The compressing position occurs at a first angular position of the sonotrode platform. Each sonotrode is energized at the compressing position.

Embodiments herein further include a method for joining components, the method comprising disposing a container on a receptacle. The receptacle is mounted to a rotating base platform. The method includes rotating a sonotrode platform at the same velocity as the base platform, the rotating sonotrode platform comprising a sonotrode disposed adjacent to the receptacle. The sonotrode is moved in a reciprocating motion between a release position distant from the receptacle and a compressing position proximal to the receptacle. The compressing position occurs at a first angular position of the sonotrode platform. The sonotrode is energized at the compressing position.

Embodiments herein further include a system for sealing filled containers. The system includes a plurality of ultrasonic sealing heads mounted on a first movable structure for movement about a closed circuit, the closed circuit including a sealing path portion. The system includes a plurality of container receptacles mounted on a second movable structure for moving containers along the sealing path portion of the closed circuit. The system includes a lid supply mechanism configured to provide a lid to each container moved by the plurality of container receptacles. Each ultrasonic sealing head moves in a reciprocating motion to ultrasonically weld each container to each lid disposed thereon.

Embodiments herein further include a method for sealing filled containers. The method includes disposing a container on a container receptacle, the container receptacle being mounted on a movable structure. The method includes disposing a lid on the container. The method includes moving the receptacle about a closed circuit. The closed circuit includes a sealing path portion. The method includes moving an ultrasonic sealing head about a closed circuit, the closed circuit of the ultrasonic sealing head including a sealing path portion adjacent to the sealing path portion of the closed circuit of the receptacle. The method further includes moving the sonotrode toward the receptacle in a reciprocating motion to ultrasonically weld the container to the lid, the ultrasonic welding occurring in the sealing path portion.

Embodiments herein further include a system for joining components. The system for joining components includes a conveyor movable along a path and a plurality of anvils for receiving containers. The plurality of anvils are mounted to the conveyor. The system includes a plurality of sonotrodes movably mounted above the plurality of anvils such that the plurality of sonotrodes can move along a path corresponding with the path of the conveyor and at the same speed as the conveyor. Each sonotrode is paired with an anvil, and each sonotrode moves in a reciprocating motion between a release position distant from a corresponding anvil and a compressing position proximal to the corresponding anvil. Each sonotrode is energized at the compressing position.

BRIEF DESCRIPTION OF THE FIGURES

Aspects may be more completely understood in connection with the following drawings, in which.

While embodiments are susceptible to various modifications and alternative forms, specifics thereof have been shown by way of example and drawings, and will be described in detail. It should be understood, however, that the scope herein is not limited to the particular embodiments described. On the contrary, the intention is to cover modifications, equivalents, and alternatives falling within the spirit and scope herein.

DETAILED DESCRIPTION

There are a variety of methods for sealingly engaging a filled food container with a lid. In some examples, plastic food containers receive a plastic film that is conductively heat sealed to the containers. Such films can be fed across a multi-lane cup filling line, cut to fit the cups, sealed over the product, and then the skeletal remains of the film are removed. The sealing time and index rate of such a process can require many sealing lanes to generate high throughput.

In other methods, a metal and plastic containing lid or film can be sealed to a plastic container by inductively heating the metal component of the lid such that the plastic component of the lid melts and fuses with the container. The use of such a metal and plastic hybrid lid can limit the use of such a container in a microwave heating system once the components are fused.

In yet other methods, plastic containers with metal ends can be sealed by a seaming process to achieve higher throughputs, but the containers are more difficult to recycle through a single-stream recycling system, as components can be difficult to separate.

However, embodiments herein can seal filled food containers rapidly and repeatedly using ultrasonic welding techniques allowing for the use of containers and lids without metallic content. As such, embodiments herein can and produce a filled container that is microwave safe and easily recyclable. Embodiments herein can provide feedback related to the seal quality instantly and prevent out-of-specification containers from moving to further processes.

Embodiments herein generally relate to systems and methods for ultrasonically joining a lid material to a container. Ultrasonic joining generally includes causing one or more materials to vibrate at a frequency in the ultrasonic range such that friction between components heats the interface between the materials to an extent that they become fused together. Embodiments herein can include a sealing system having components that move with the objects to be sealed, creating a continuous in-line sealing system.

Figure 1:
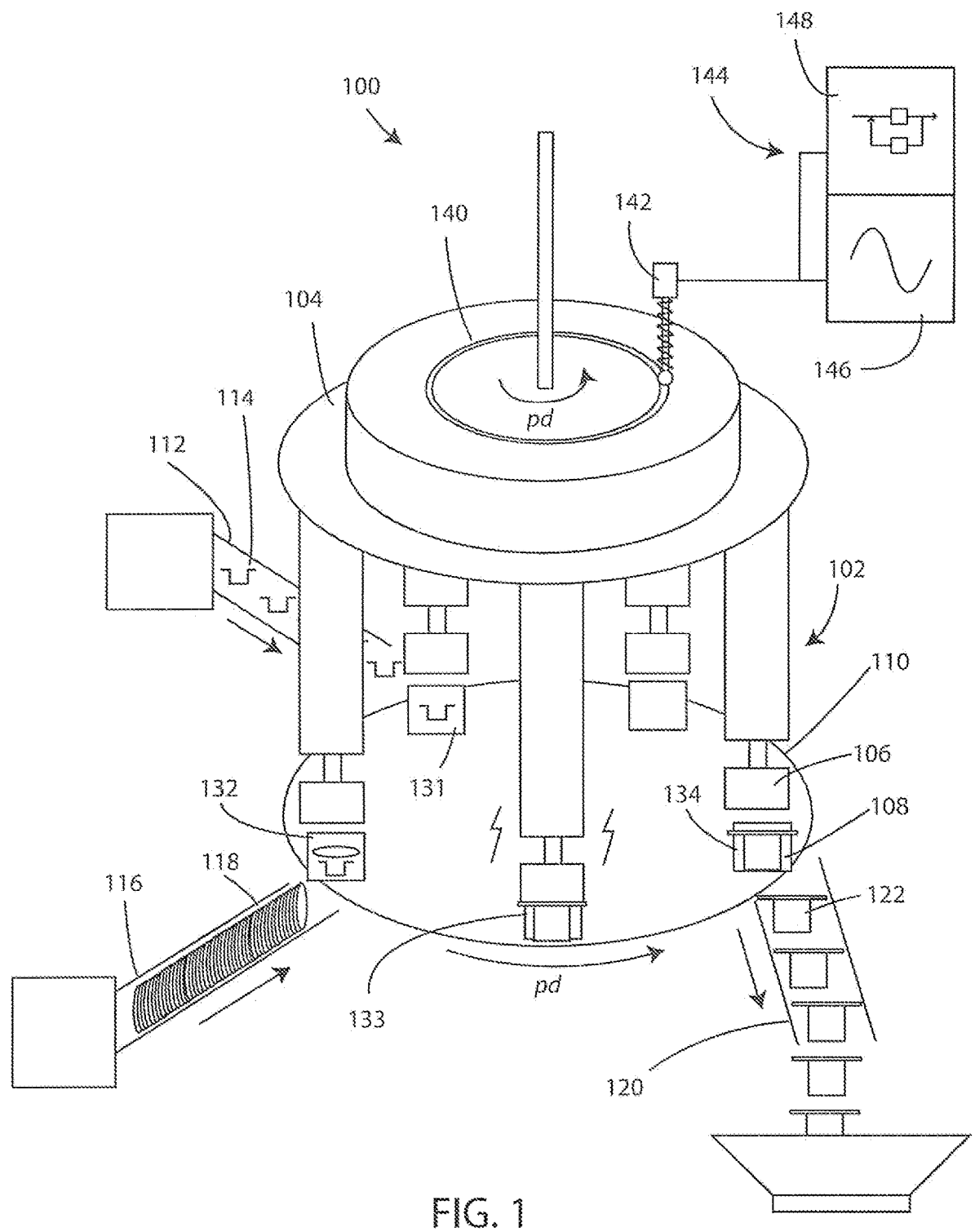
FIG. 1 is a schematic perspective view of a rotary sealing system in accordance with various embodiments herein.

Referring now to FIG. 1, a schematic perspective view is shown of a rotary sealing system 100 in accordance with various embodiments herein. The rotary sealing system 100 is generally used to join a first component and a second component. In some embodiments, the rotary system 100 is used to join a filled food container and a lid, such as a polymeric tray having a polymeric lid. While various embodiments discussed herein are illustrated and described with reference to ultrasonically "sealing" a "container" with a "lid," the systems and methods disclosed herein are generally used to ultrasonically weld two or more components together. Various aspects of components that can be joined by the systems herein will be discussed further below.

The rotary sealing system 100 generally ultrasonically joins components by way of one or more ultrasonic devices that are movably mounted. Movable ultrasonic devices can move along a processing or machine direction while simultaneously joining components. Thus the rotary sealing system 100 can enable components to be joined rapidly and as a part of an in-line transport process. The system 100 includes a plurality of ultrasonic stacks 102 (or columns). The ultrasonic stacks 102 are each mounted to a movable structure that enables the ultrasonic stacks 102 to be transported along a processing direction pd while ultrasonically joining components. The ultrasonic stacks 102 can be mounted to a rotary sonotrode platform 104. The rotary sonotrode platform can continuously or intermittently rotate in the processing direction pd.

The ultrasonic stacks 102 can include various components for ultrasonically joining components. For example, the ultrasonic stacks 102 can each include an ultrasonic transducer or converter, an ultrasonic adapter or booster, a sonotrode or ultrasonic horn, and an actuator for raising or lowering at least the sonotrode. Various details regarding ultrasonic stacks will be discussed further below herein.

Some or all components of each ultrasonic stack 102 are configured to move towards and away from the materials that are joined by the rotary treatment system 100. Specifically, at least the sonotrode 106 of each ultrasonic stack 102 is configured to move in a reciprocating motion towards and away from the materials to be joined. In some embodiments, materials to be joined by the system are supported by an anvil or receptacle. The sonotrode 106 of each ultrasonic stack 102 can reciprocally move to a compressing position adjacent to a corresponding anvil and to a release position distal from the corresponding anvil. At the compressing position, the sonotrode 106 can sandwich the materials to be joined between the sonotrode 106 and a corresponding anvil. The sonotrode 106 can apply a force or pressure to the components at the compressing position. In some cases, force can be provided with a pneumatically charged cylinder.

The sonotrode 106 can be energized at the compressing position such that the sandwiched components are ultrasonically joined. The ultrasonic joining of components can be referred to as the "sealing stage" of operation of the rotary sealing system 100.

In some embodiments, positional location of the sonotrode can measured and can be provided to a feedback system to ensure all components to be sealed (e.g., lid, container, or the like) are present and in a correctly seated position. As such, in some embodiments, one or more positional sensors are included to measure or detect positional location of the sonotrode. Positional sensors can include, but are not limited to, resistive sensors, capacitive sensors, inductive sensors, optical sensors, and the like. In some embodiments, the absence of the proper components or the improper presence of components (too many or the wrong type) can result in an incorrect makeup height. In such cases, the system can be configured to cause the sonotrode to not fire, thereby protecting the sonotrode and/or anvil from possible damage.

The rotary sealing system 100 can include a plurality of anvils 108 to cooperatively act with the plurality of ultrasonic stacks 102 to perform the above-mentioned actions. Specifically, each anvil 108 can be paired with a corresponding ultrasonic stack 102. At the compressing position, the sonotrode 106 of each ultrasonic stack 102 can be moved downward to a compressing position adjacent to its corresponding anvil 108 and upward to a release position distal from its corresponding anvil 108. The compressing, release, and intermediate positons of the each sonotrode 106 can occur at different locations along the processing direction pd of the rotating sonotrode platform 104.

Each anvil 108 can be movably mounted such that they can each be moved along the processing direction pd while joining components. The plurality of anvils 108 can be mounted to a base platform 110. The base platform 110 can continuously or intermittently rotate in the processing direction pd while the anvils 108 and ultrasonic stacks 102 cooperatively act to join components.

The rotating sonotrode platform 104 and the base platform 110 generally rotate in coordination such that one or more sonotrodes 106 maintain axial alignment with one or more anvils 108 during processing. While axial alignment between sonotrodes 106 and anvils 108 does not need to be maintained during the entire range of motion of the respective sonotrode platform 104 and base platform 110, axial alignment is maintained between a sonotrode 106 and a corresponding anvil 108 while components are compressed between the sonotrode 106 and anvil 108 and ultrasonically joined. In some embodiments, the sonotrode platform 104 and the base platform 110 rotate in synchrony and in phase with each other, wherein the phase is determined by the relative angular positions of a sonotrode 106 and a corresponding anvil 108. In some embodiments, the sonotrode platform 104 and the base platform 110 are mechanically coupled such that they rotate in synchrony and in phase. For example, the sonotrode platform 104 and the base platform 110 could be an integral machine component having a common shaft and drive mechanism. In some embodiments, the sonotrode platform 104 and the base platform 110 are not mechanically coupled, but maintain synchrony and phase by way of a controller and one or more position sensors.

In some embodiments, the rotary sealing system 100 includes one or more mechanisms for supplying the various components to be joined. The rotary sealing system 100 can include a container supply mechanism 112 for supplying a filled food container 114 to the system. The container supply mechanism 112 can provide filled food containers 114 to anvils, which can be configured as container receptacles. The container supply mechanism 112 can include conveyors and/or other transfer mechanisms for providing filled food containers 114 to the anvils 108 while they are either stationary or moving. The various aspects of the container supply mechanism 112 are not particularly limited. The rotary sealing system 100 can include a lid supply mechanism 116 for supplying container lids 118 to the system. The lid supply mechanism 116 can provide lids 118 to filled food containers 114. Lids 118 can be disposed on the filled food containers 114 while the food containers are on the container supply mechanism 112 or after they have been received by the anvils 108. The lid supply mechanism can include a magazine, a scroll feeder, a chute feeder, or other mechanisms for providing lids. The various aspects of the lid supply mechanism 116 are not particularly limited.

The rotary sealing system 100 includes a mechanism for removing containers from their respective anvils after they have been ultrasonically sealed with lids. The rotary sealing system 100 can include a removing mechanism 120 for removing sealed containers 122 from the system. The removing mechanism 120 can include conveyors and/or other transfer mechanisms for removing sealed containers 122 from their respective anvils 108 and transferring them to a downstream location. In some embodiments. The various aspects of the removing mechanism 120 are not particularly limited.

The rotary sealing system 100 can operate continuously or intermittently. Different stages of operation can occur at different angular positions of the sonotrode platform 104 and the base platform 110. The various angular positions relevant to the different stages of operation will be described with reference to the angular position of the base platform 110, although these angular positions can also be used to described the angular position of the sonotrode platform 104 in the various embodiments in which the sonotrode platform 104 and the base platform 110 operate in synchrony and in phase with each other. The relative angular components may be described as "upstream" or "downstream" from each other. These terms as applied herein relate to the path that an element being processed by the system would travel between the two components as it travels through the system in the processing direction pd. The container supply mechanism 112 and the lid supply mechanism 116 generally dispose containers 114 and lids 118 on anvils 108 at an angular position that is upstream from the removing mechanism 120. The sealing stage of operation wherein containers are ultrasonically joined with lids generally occurs within a range of angular positions downstream from the container supply mechanism 112 and the lid supply mechanism 116 and upstream from the removing mechanism 120.

In some embodiments, the containers 114 are disposed on anvils 108 at an angular position of the base platform 110 that is upstream from the angular position of the lid supply mechanism 116. In such embodiments, the lid supply mechanism 116 can dispose lids 118 on containers 114 that are already disposed on an anvil 108. In some embodiments, the lid supply mechanism 116 cooperates with the container supply mechanism 112 and supplies a lid 118 to a corresponding container 114 before the container 114 is disposed on an anvil 108. In some such embodiments, a container supply mechanism 112 can supply containers having lids pre-disposed thereon to anvils 108 on the base platform.

In some embodiments, the rotary ultrasonic sealing system incorporates a container flush system for modifying the container headspace on filled food containers prior to disposing a lid thereon. For example, prior to disposing a lid onto a container, the container can be dosed with steam or another sterile gas to remove oxygen from the container. Ports for providing a flushing gas can be integrated with anvils, sonotrodes, and/or other parts of a rotary sealing system.

The actuation of the container supply mechanism 112 and the lid supply mechanism 116 can occur while the base platform 110 operates continuously. Alternatively, the actuation of the container supply mechanism 112 and the lid supply mechanism 116 can occur while the base platform 110 operates intermittently, the base platform 110 intermittently pausing at certain angular positions (an indexing movement) to allow containers, lids, or both to be disposed on corresponding anvils 108. The angular position of the container supply mechanism 112, the lid supply mechanism 116, and the removing mechanism 120 can be configured to match a desired throughput rate and sealing time required by the system 100. The angular position can be dependent on the number of ultrasonic stacks 102 and corresponding anvils 108 employed by the rotary sealing system 100.

While the rotary sealing system 100 depicted in FIG. 1 has five ultrasonic stacks 102 corresponding with five anvils 108 for purposes of illustration, other numbers of ultrasonic stacks and corresponding anvils can be used. The angular spacing between the lid supply mechanism 116, the container supply mechanism 112, and the removing mechanism 120 can be related to the angular spacing between anvils 108. For example, the angular spacing between the container supply mechanism 112 and the lid supply mechanism 116 can be the same as the angular spacing between adjacent anvils 108. As such, a first anvil 131 can receive a container 114 while an adjacent anvil 132 having a container 114 already disposed thereon can receive a lid 118. Such configurations can allow multiply actions to be undergone simultaneously at intermittent stops of a base platform 110 and thus minimize the number of stops required by the base platform 110 while it intermittently rotates.

The angular position of the removing mechanism 120 can also related to the angular spacing between anvils 108. The angular distance between the removing mechanism 120 and the container supply mechanism 112 or the lid supply mechanism 116 can be equal to an integer multiple of the angular spacing between adjacent anvils. For example, the removing mechanism 120 can be positioned at a distance equal to twice the angular distance between adjacent anvils. In the exemplary system 100 depicted in FIG. 1, a third anvil 133 is positioned between the second anvil and a fourth anvil 134. The fourth anvil 134 is adjacent to the removing mechanism 120 so that sealed containers can be removed from the anvil while the container supply mechanism 112 and the lid supply mechanism 116 dispose their respective components on their respective first anvil 131 and second anvil 132. A third anvil 133 disposed between the second anvil 132 and the fourth anvil 134 can hold a container and lid that are being compressed and ultrasonically joined.

In some embodiments the system 100 can have a mechanism for providing electrical communication between the rotational elements of the system and a static electrical power or signal source. The system 100 can have a slip ring 140 for interacting with a brush mechanism 142 to provide electrical communication. The slip ring 140 can be an electrically-conducive ring located on the sonotrode platform 104 that is concentric with the axis of rotation of the sonotrode platform 104. The slip ring 140 can also be located on the base platform 110 or another rotating component of the rotary sealing system 100. The slip ring 140 can slidingly engage with electrically conductive brushes of a brush mechanism 142 such that an electrically conductive path is maintained between the slip ring 140 and the brush mechanism 142 while the slip ring 140 is rotating. Other mechanical rotary coupling mechanisms can also be used that can provide transmission of data and power to the sonotrode platform 104 without the use of brushes.

The slip ring can allow electrical power and signals to be communicated to and from the rotating components of the rotary sealing system 100. The slip ring can provide electrical communication between the rotating components of the system 100 and a control station 144. The control station 144 can include a power generator 146 for providing the electrical power to the ultrasonic stacks 102. The power generator 146 can include an inverter transducer control system that can interface with the sonotrode platform 104 by way of a frequency generator cable and the slip ring 140. The electrical requirements for actuating ultrasonic stacks 102 will be discussed further below herein. The control station 144 can also include a feedback module 148 for receiving signals from various sensors on the ultrasonic stacks 102 and determining whether the output of the power generator 146 should be altered. Various aspects of the sensors and feedback module 148 will be discussed further below herein.

Figure 2:
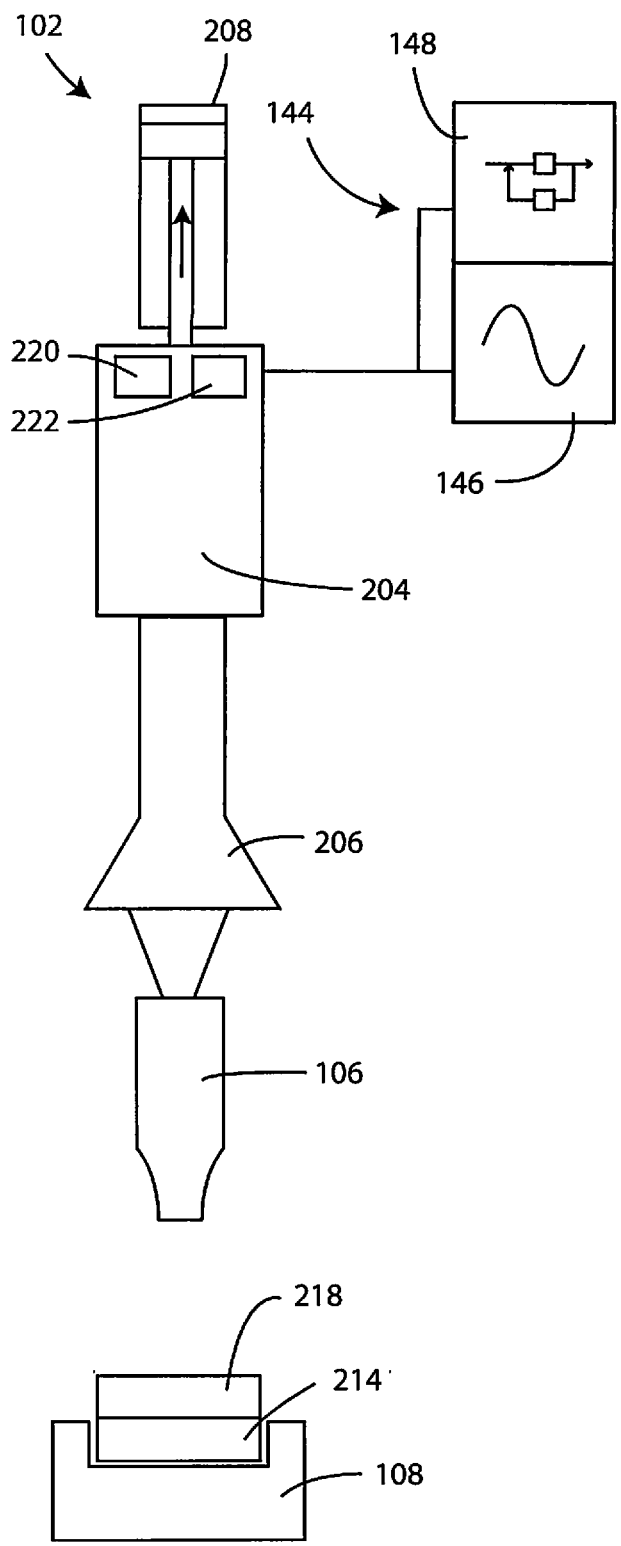
FIG. 2 is a schematic side view of an exemplary ultrasonic stack in a release configuration in accordance with various embodiments herein.
Figure 3:
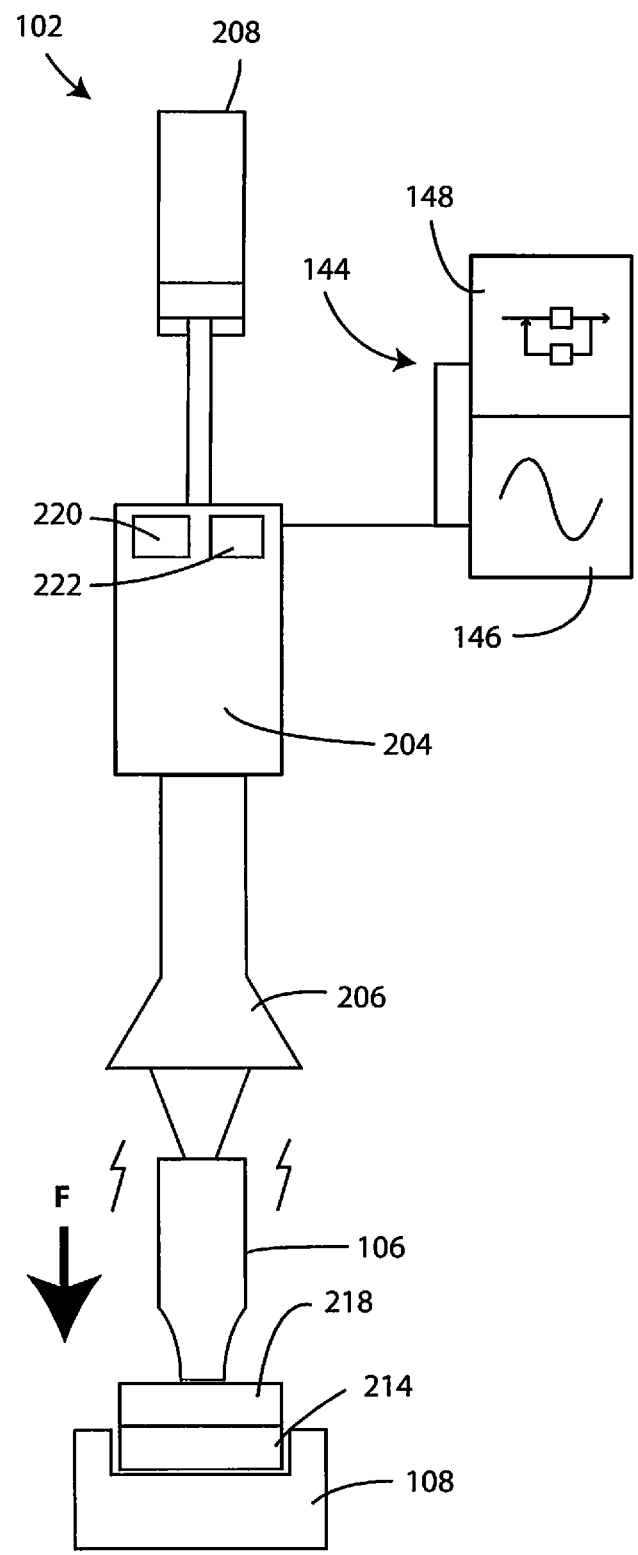
FIG. 3 is a schematic side view of an exemplary ultrasonic stack in a compressing position in accordance with various embodiments herein.

Referring now to FIGS. 2 and 3, a schematic side view is shown of an exemplary ultrasonic stack 102 in a release configuration (FIG. 2) and a compressing configuration (FIG. 3). The ultrasonic stack 102 can be used on the various sealing systems disclosed herein. The ultrasonic stack 102 can have a sonotrode 106 for interacting with a first component 214 and a second component 218. In some embodiments, the first component 214 is a filled food container and the second component 218 is a lid. The first component 214 and the second component 218 can be supported by an anvil 108.

The sonotrode 106 is a machine component configured to interact with materials and cause them to vibrate at an ultrasonic frequency. The sonotrode 106 can include a solid body with a geometry configured to interact with materials in a desired manner. The sonotrode 106 is generally configured to vibrate at a frequency and with an amplitude that is sufficient to the target materials in contact with the sonotrode 106 to melt and fuse together. The sonotrode can have a geometry configured to maximize the fatigue lifetime of the sonotrode. The sonotrode can be composed of various metals, including, but not limited to titanium or various titanium alloys. The sonotrode can be composed of materials capable of rapidly expanding and contracting without fracturing.

Vibrations are provided to the sonotrode 106 by a transducer 204. The transducer 204 can include one or more elements for converting electrical power signals into mechanical vibrations. In some embodiments, one or more piezoelectric actuators are used by the transducer 204 to create mechanical vibrations. The transducer 204 can be in communication with a power supply. Power can be provided to the transducer 204 at a frequency, amplitude, and waveform that will effect a desired vibration.

In some embodiments, the vibrations produced by the transducer 204 are modified before they reach the sonotrode 106. The ultrasonic stack 102 can include a booster 206 interposed between the transducer 204 and the sonotrode 106. The booster 206 can be used to modify the vibrations produced by the transducer 204. In some embodiments, the booster 206 is used to increase the amplitude of the vibrations such that the sonotrode 106 vibrates with a higher amplitude than the transducer 204. The booster 206 can cooperatively act with the sonotrode 106 to modify the amplitude of ultrasonic vibrations. In some embodiments, the sonotrode 106 and booster 206 have a resonant frequency that is about equal to the frequency of vibrations provided by the transducer 204.

The ultrasonic stack 102 can include a drive mechanism for causing the stack to be reciprocally moved between the release and compressing positions. A linear actuator 208 can be used to move the ultrasonic stack 102 between the release position and the compressing position. The linear actuator 208 can be an electric, hydraulic, pneumatic, or other type of linear actuator capable of moving the ultrasonic stack 102.

The release position (FIG. 2) of the ultrasonic stack 102 is a configuration wherein a space exists between the sonotrode 106 and the second component 218. The sonotrode 106 is distant from the anvil 108 at the release position. At the release position, sufficient clearance is provided between the sonotrode 106 and the anvil 108 that components can be positioned in and removed from the anvil 108. The ultrasonic stack 102 can be configured in the release position when a first component 214, such as a filled food container, is disposed on the anvil 108. Similarly, the ultrasonic stack 102 can be configured in a release position when a second component 218, such as a lid, is disposed on the first component 214. The ultrasonic stack 102 can be configured in the release position when the joined first component 214 and second component 218 are removed from the anvil after ultrasonic processing.

The compressing positon (FIG. 3) of the ultrasonic stack 102 is a configuration wherein no gap exists between the sonotrode 106 and the second component 218. The sonotrode 106 is proximal to the anvil 108 at the compressing position. At the compressing position, the sonotrode 106 applies a force F to the materials and sandwiches them against the anvil 108. The force can be provided by the linear actuator 208. While applying a force F to the material of the first component 214 and the material of the second component 218, the sonotrode 106 can be energized to ultrasonically weld the materials together. "Energizing" the sonotrode 106 refers to providing ultrasonic vibrations to the sonotrode 106 by way of the transducer and other elements of the ultrasonic stack.

In some embodiments, the geometry of the material of the first component 214 and the material of the second component 218 changes as the materials are ultrasonically joined or sealed together. For example, as a portion of the material of the first component 214 is melted and fuses with a melted portion of the material of the second component 218, the materials may reduce in height in at least one dimension compared to the starting position. As a result, the linear actuator 208 or other force applying mechanism can adjust the position of the sonotrode such that a constant force is applied to the materials. The ultrasonic stack 102 can include various sensors for determining welding parameters in order to provide feedback relating to the weld. The ultrasonic stack 102 can include a force sensor 220 for measuring the amount of force applied by the sonotrode 106 to the materials being joined. The ultrasonic stack 102 can include a displacement sensor 222 for determining the position of the sonotrode 106 or other movable components of the stack 102 with reference to a fixed location, such as the anvil 108. Other sensors can be used to measure parameters relating to ultrasonic welding, including, but not limited to energy (which can be measured in joules), time, and power (which can be measured in watts).

The various sensors employed by an ultrasonic stack 102 can be in communication with a control station 144. The control station 144 can be consistent with the various control stations described herein, and thus can have a power generator 146 and a feedback module 148. Signals from the displacement sensor 222, the force sensor 220, or other sensors of the ultrasonic stack can be processed at the control station 144. The feedback module 148 can determine whether the output of the power generator 146 should be adjusted based on the output of the sensors. The control station 144 can provide drive signals and power for both the ultrasonic functionality of the ultrasonic stack 102 and the linear actuation functionality of the ultrasonic stack 102. In some embodiments, the control station 144 is remote from the ultrasonic stack 102. In some embodiments, the control station 144 can be movably mounted to a structure with one or more ultrasonic stacks 102.

Figure 4:
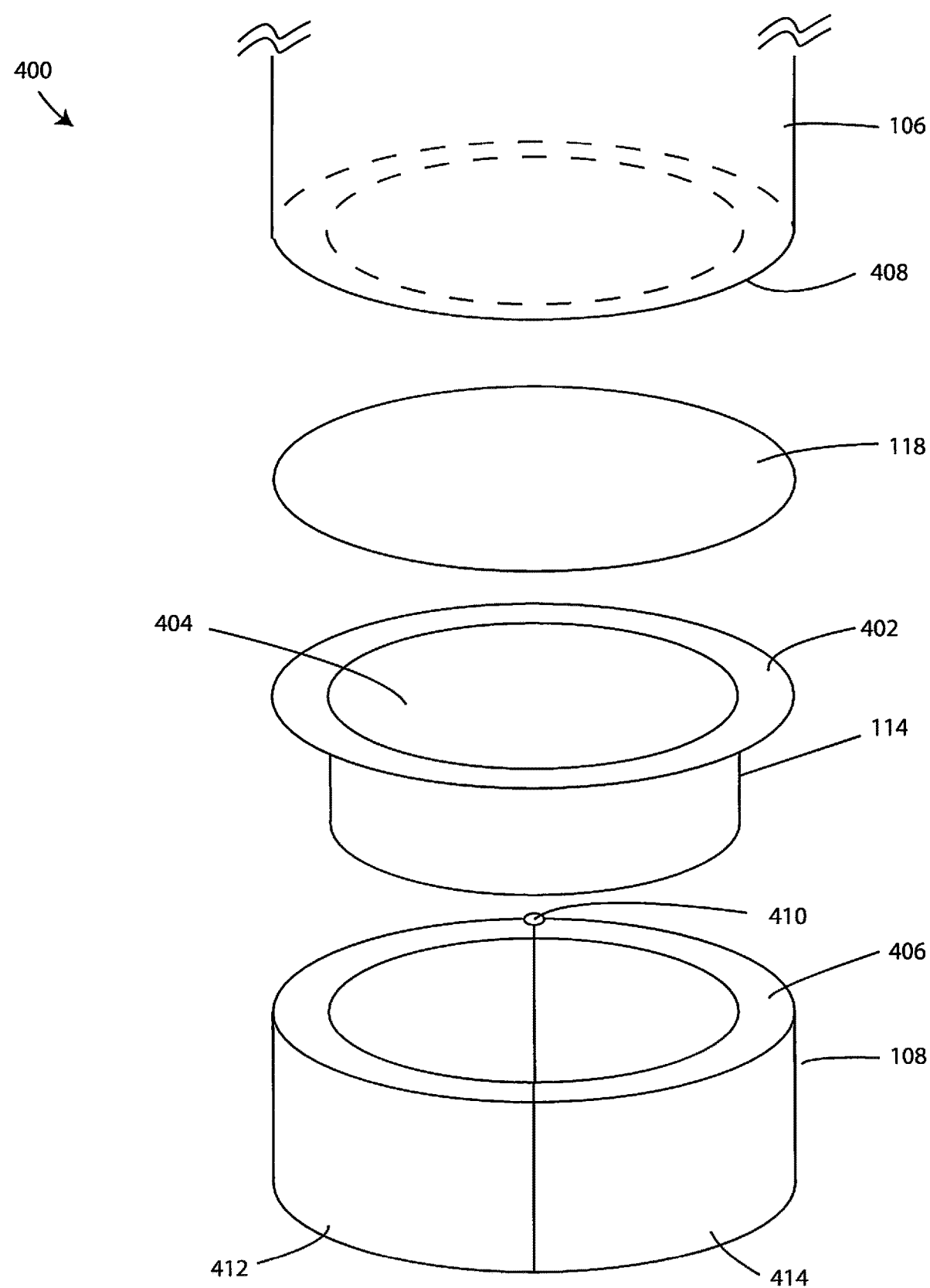
FIG. 4 is a schematic perspective exploded view of an ultrasonic sealing assembly in accordance with various embodiments herein.

Referring now to FIG. 4, a schematic perspective exploded view is shown of an ultrasonic sealing assembly 400 in accordance with various embodiments herein. The sealing assembly can be a part of the various ultrasonic joining and sealing systems disclosed herein. The sealing head assembly 400 includes a sonotrode 106. The sonotrode 106 can be consistent with the various sonotrodes described herein. The sealing assembly also includes an anvil 108 corresponding to the sonotrode 106. The anvil 108 can be consistent with the various anvils described herein. The sonotrode 106 can function as a sealing head to cooperate with the anvil 108 to sealingly join two components. The ultrasonic sealing assembly 400 can be used to join a container 114 (such as a food container) and a lid 118.

The container 114 can define a flange 402 (or joining surface) for receiving a lid 118. The flange 402 and the lid 118 can form a seal when ultrasonically joined. The flange 402 and the lid 118 can isolate an inner cavity 404 of the container 114 from an ambient environment when the flange 402 and the lid 118 are ultrasonically joined. The container 114 and the lid 118 are generally composed of materials capable of being joined by ultrasonic welding techniques. Various aspects of the container and lid design and materials will be described further below herein.

The anvil 108 is generally configured as a receptacle for the food container 114. The anvil 108 can define a support surface 406 for holding the container 114. The support surface 406 can be a lip that interfaces with the flange 402 of the container 114. The support surface 406 can hold a container 114 with a lid 118 disposed thereon. The support surface 406 can have a shape that matches the shape of the flange 402. The Support surface 406 can have a shape that matches the shape of a contact surface 408 of the sonotrode 106. The contact surface 408 and the support surface 406 each generally have shapes that cooperatively hold two or more materials together in a desired manner such that a desired ultrasonic joint will be formed between the materials. In the example shown in FIG. 4, the desired sealing assembly 400 is configured to provide an ultrasonic joint between the lid 118 and the container 114 at the flange 402. The anvil 108 can be configured to restrict side-to-side motion of the food container 114 during sealing. The anvil 108 can also prevent the body of the food container 114 from being compressed during sealing. Preventing compression and lateral movement can ensure that the downward force of the sonotrode 106 produces an even seal around the flange 402 and an even melting material at the ultrasonic weld junction.

When the sonotrode 106 is moved downward to a compressing position proximal to the anvil 108, the lid 118 and the flange 402 of the container 114 are compressed between the contact surface 408 of the sonotrode 106 and the support surface 406 of the anvil 108. At the compressing position, the sonotrode 106 can be energized or ultrasonically actuated. The energized sonotrode 106 can cause the lid 118 and the container 114 to be ultrasonically welded together at the flange 402 of the container 114. The welding process can be consistent with that described above with reference to FIGS. 2 and 3.

The anvil 108 can be configured to facilitate the receipt and removal of the food container 114 by way of a container supply mechanism and removal mechanism. The anvil can be configured as a clasp mechanism for opening and closing to facilitate the receipt and removal of the food container 114. The anvil can include a hinge 410 or other pivot structure for allowing a first section 412 and a second section 414 move relative to each other for receiving and ejecting food containers 114. Various anvil structures are contemplated herein that provide the ability to rapidly receive and eject food containers on the continuous and intermittent sealing systems disclosed herein.

Figure 5:
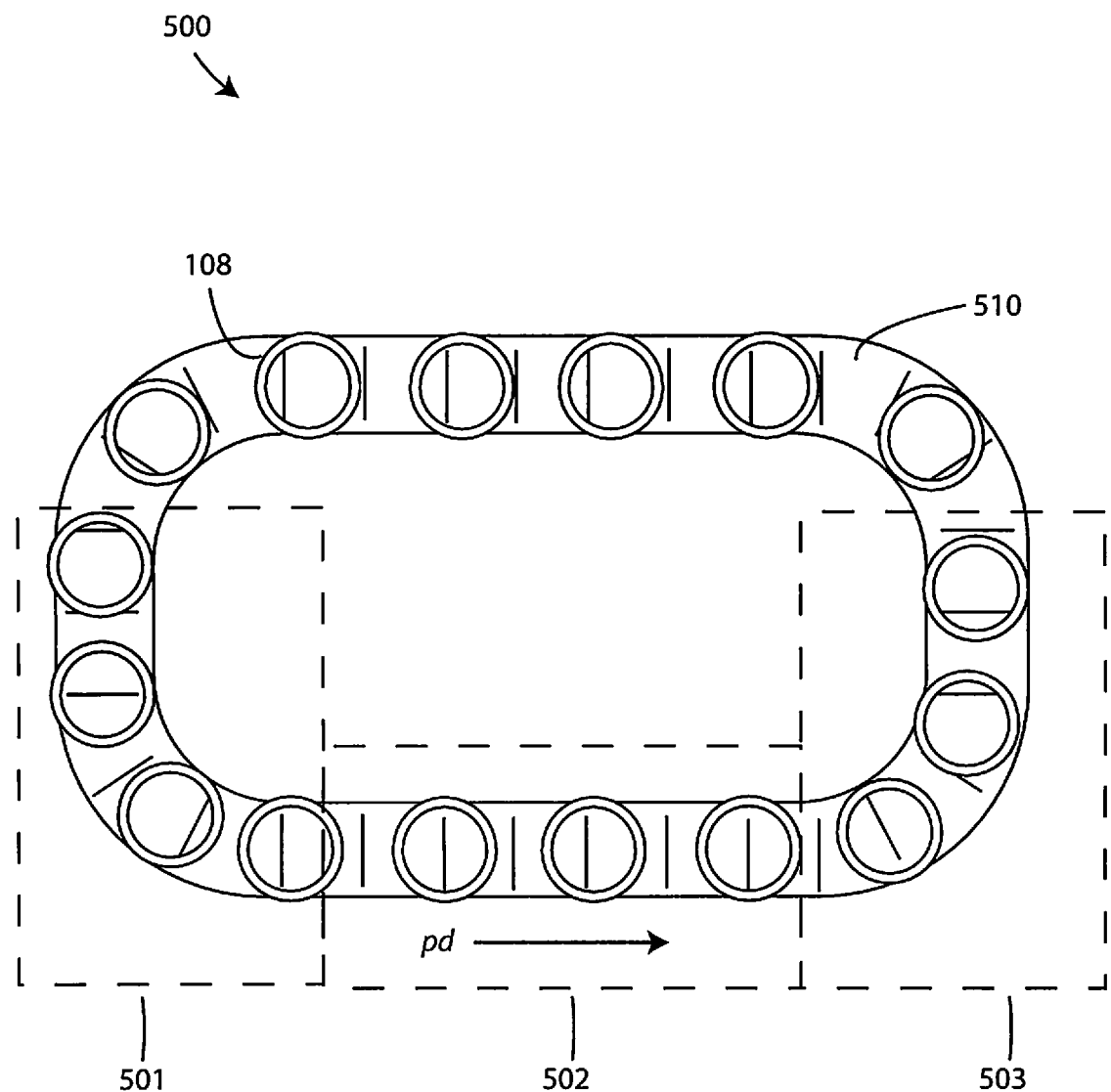
FIG. 5 is a schematic top view of a receptacle conveyor path in accordance with various embodiments herein.

The ultrasonic energization and linear actuation of the various ultrasonic stacks disclosed herein can occur at different phases or positions within a rotary ultrasonic sealing system. Referring now to FIG. 5, a schematic top view is shown of a receptacle conveyor path 500 in accordance with various embodiments herein. The particular conveyor path 500 shown in FIG. 5 is substantially rectangular, but rotary systems having other paths can be functionally represented by the conveyor path 500. For example, the operations performed by the various rotary sealing systems 100 described above with reference to FIG. 1 can be represented by the schematic conveyor path 500.

The conveyor path 500 can be defined by the track of a conveyor 510. The conveyor 510 can be a movable structure configured to move about a closed circuit. The conveyor 510 can include a plurality of anvils. The anvils can be consistent with the various anvils disclosed herein. The closed circuit defined by the conveyor path 500 can include a receiving path portion 501, a sealing path portion 502, and a release path portion 503.

The receiving path portion 501 of the conveyor path is generally a portion in which empty anvils receive one or more components. At the receiving path portion 501, an anvil 108 can receive a first component and a second component that are to be ultrasonically joined downstream from the receiving path portion 501. In some embodiments, each anvil 108 receives a food container as it travels through the sealing path portion 501 of the conveyor path 500. In some embodiments, each anvil 108 further receives a lid as it travels through the sealing path portion 501. In some embodiments, each anvil 108 receives a container having a lid disposed thereon as it travels through the receiving portion 501. Supply mechanisms such as container supply mechanisms and lid supply mechanism can be used to supply containers, lids, and other objects to anvils 108 at the receiving path portion 501.

The sealing path portion 502 of the conveyor path 500 is generally downstream from the receiving path portion 501 in a processing direction pd. The sealing path portion 502 is generally a portion in which components disposed on anvils 108 are ultrasonically welded, sealed, or otherwise joined by the various ultrasonic stacks disclosed herein. Along the sealing path portion, sonotrodes are moved in a reciprocating motion from a release position distant from corresponding anvils 108 to a compressing position adjacent to the corresponding anvils 108. The components contained on the anvil 108 while being compressed by corresponding sonotrodes are ultrasonically joined by ultrasonic vibrations provided by the sonotrode.

After being ultrasonically welded, the joined component held by each anvil 108 is ejected or otherwise released from the anvil 108 at a position along a release path portion 503. The release path portion 503 is generally downstream from the sealing path portion 502 of the conveyor path 500. In some embodiments, a sealed container is ejected from an anvil by a removing mechanism at a position along the release path portion 503. In some embodiments, the anvils 108 can perform an action to facilitate the release of sealed containers or other objects therefrom. In some embodiments, anvils 108 having hinged members can open to facilitate the release or ejection of sealed containers or other objects therefrom.

Figure 6:
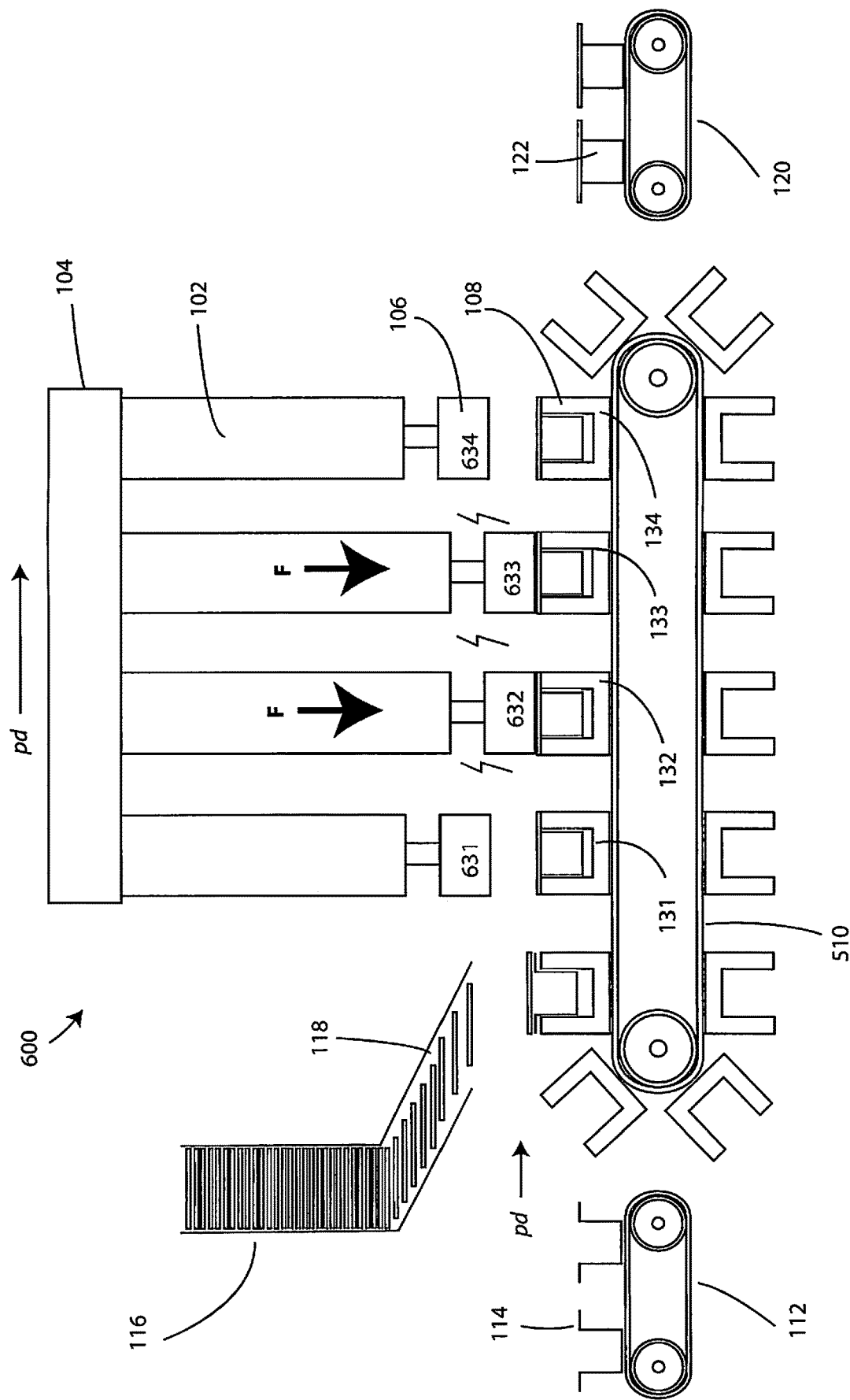
FIG. 6 is a schematic side view of a sealing system in accordance with various embodiments herein.

Referring now to FIG. 6, a schematic side view is shown of a sealing system 600 in accordance with various embodiments herein. The sealing system 600 is configured to ultrasonically join components in a manner functionally consistent with the various sealing systems described above with reference to FIG. 1, and can thus incorporate many similar elements. The sealing system 600 includes a plurality of ultrasonic stacks 102 consistent with the various ultrasonic stacks described herein. The ultrasonic stacks 102 can be mounted on a movable sonotrode platform 104. The movable sonotrode platform 104 can operate continuously or intermittently. The sealing system 600 includes a plurality of anvils 108 consistent with the various anvils described herein. The anvils can be mounted on a conveyor 510. The conveyor 510 can operate continuously or intermittently.

The sealing system 600 can include a container supply mechanism 112 for supplying containers 114 to the anvils 108. The sealing system 600 can include a lid supply mechanism 116 for supplying lids 118 to the containers 114 disposed on the anvils 108. The system can further include a removing mechanism 120 for removing sealed containers 122 from each anvil 108 of the system 600.

The conveyor 510 can move anvils 108 along a path having a processing direction pd at a velocity. For at least a sealing path portion of the path traveled by the anvils, each anvil 108 is paired with a corresponding sonotrode 106 of an ultrasonic stack 102. The ultrasonic stacks 102 are mounted above the plurality of anvils at the sealing path portion and can move along a path corresponding with the path of the conveyor and at the same speed as the conveyor.

Along the sealing path portion, the sonotrode 106 of each ultrasonic stack 102 can move in a reciprocating motion between a release position distant from a corresponding anvil 108 and a compressing position proximal to the corresponding anvil 108. Each sonotrode 106 can be energized at the compressing position to ultrasonically join components. The sealing system 600 includes a first anvil 131 and a corresponding first sonotrode 631 along the sealing path portion. The first sonotrode 631 is at a release position and is distant from the first receptacle 108, the receptacle having a container 114 and lid 118 disposed thereon. The sealing system 600 includes a second anvil 132 and a corresponding second sonotrode 632 along the sealing path portion. The second sonotrode 632 is at a compressing position and is proximal to the first receptacle 108, the receptacle having a container 114 and lid 118 disposed thereon. The container 114 and the lid 118 can be compressed between the second sonotrode 632 and the second anvil 132 at the compressing position. The second sonotrode 632 can be energized at the compressing position such an ultrasonic welding or joining process is undergone. The sealing system 600 also includes a third anvil 133 and a corresponding third sonotrode 633 along the sealing path portion. The third sonotrode 633 can be energized and at a compressing position consistent with the second sonotrode 632. In some embodiments, the system can have more than two sonotrodes and corresponding anvils at an energized compressing position, depending on the necessary residence time of a container and lid in an ultrasonic welding configuration to sealingly join them at a desired throughput rate of the system. The sealing system 600 includes a fourth anvil 134 and a corresponding fourth sonotrode 634 along the sealing path portion. The fourth sonotrode 634 is at a release position distant from the fourth anvil 134. At the release position, a sealed container 122 can be removed from the fourth anvil 134 by the removing mechanism 120 and transported to downstream processes.

Figure 7:
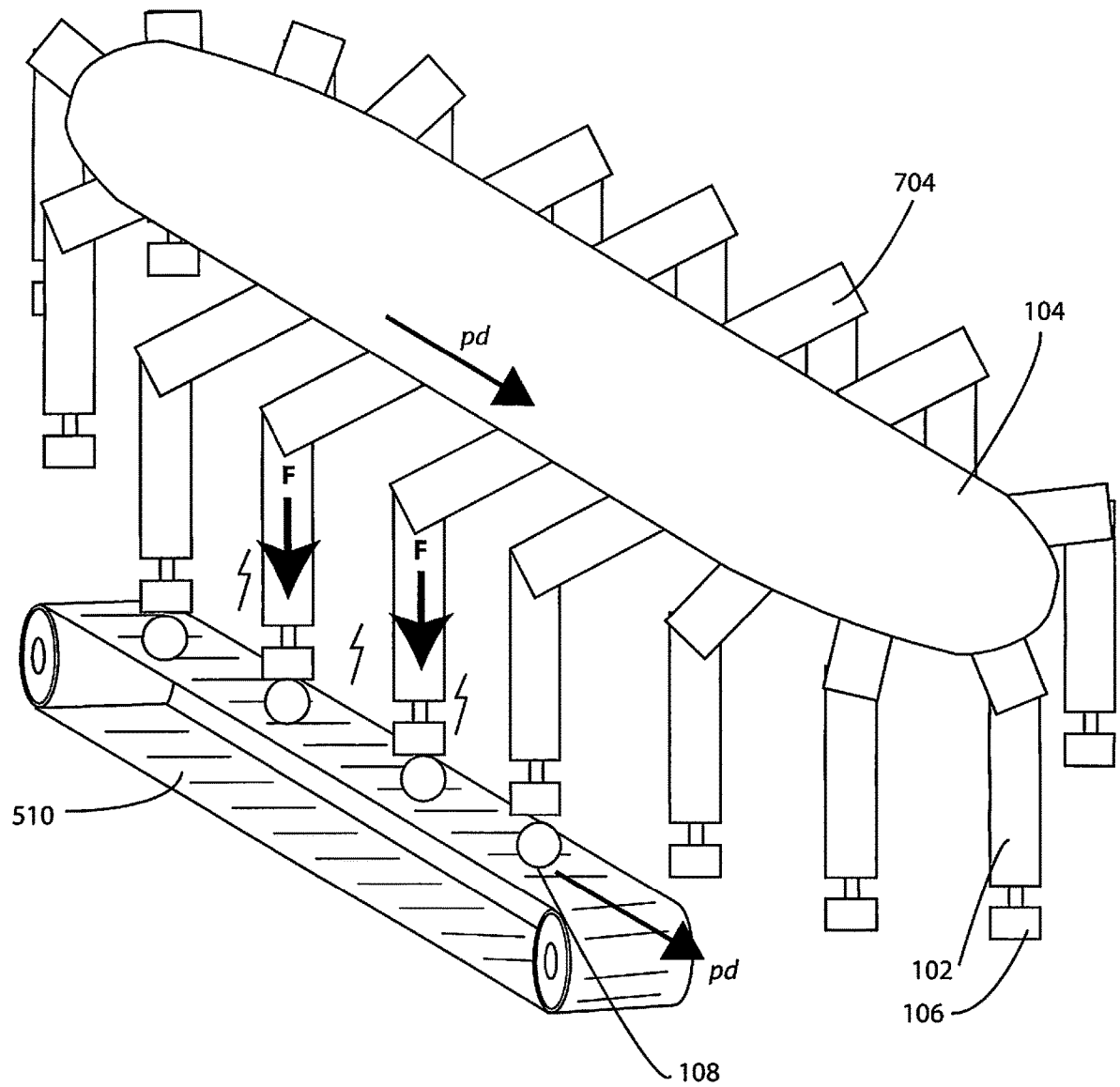
FIG. 7 is a schematic perspective view of a sealing system in accordance with various embodiments herein.

Referring now to FIG. 7, a schematic perspective view is shown of a sealing system 700 in accordance with various embodiments herein. The sealing system 700 is configured to ultrasonically join components in a manner functionally consistent with the various sealing systems described above and can thus incorporate many similar elements. The sealing system 700 includes a plurality of ultrasonic stacks 102 consistent with the various ultrasonic stacks described herein. Each ultrasonic stack 102 can be mounted on a movable sonotrode platform 104. The movable sonotrode platform 104 can operate continuously or intermittently in a processing direction pd. The sealing system 700 includes a plurality of anvils 108 consistent with the various anvils described herein. The anvils can be mounted on a conveyor 510. The conveyor 510 can operate continuously or intermittently in a processing direction pd. The sealing system 700 can include a container supply mechanism for supplying containers to the anvils 108. The sealing system 700 can include a lid supply mechanism for supplying lids to the containers disposed on the anvils 108. The system can further include a removing mechanism for removing sealed containers from each anvil 108 of the system 700.

The sonotrode platform 104 can be configured as a conveyor for conveying ultrasonic stacks 102. Each ultrasonic stack can be movably mounted to the sonotrode platform by a mounting structure 704. Each mounting structure 704 can move around the sonotrode platform 104 in a closed circuit having a sealing path portion, the mounting structures 704 moving continuously or intermittently in a processing direction pd. At the sealing path portion, the sonotrode 106 of each ultrasonic stack 102 can align with a corresponding anvil 108. At the sealing path portion, each sonotrode 106 can move in a reciprocating motion between a release position distant from a corresponding anvil 108 and a compressing position proximal to the corresponding anvil 108, each sonotrode 106 being energized at the compressing position. Energized sonotrodes 106 at the compressing position can be used to ultrasonically join components, such as a container and a lid.

Figure 8:
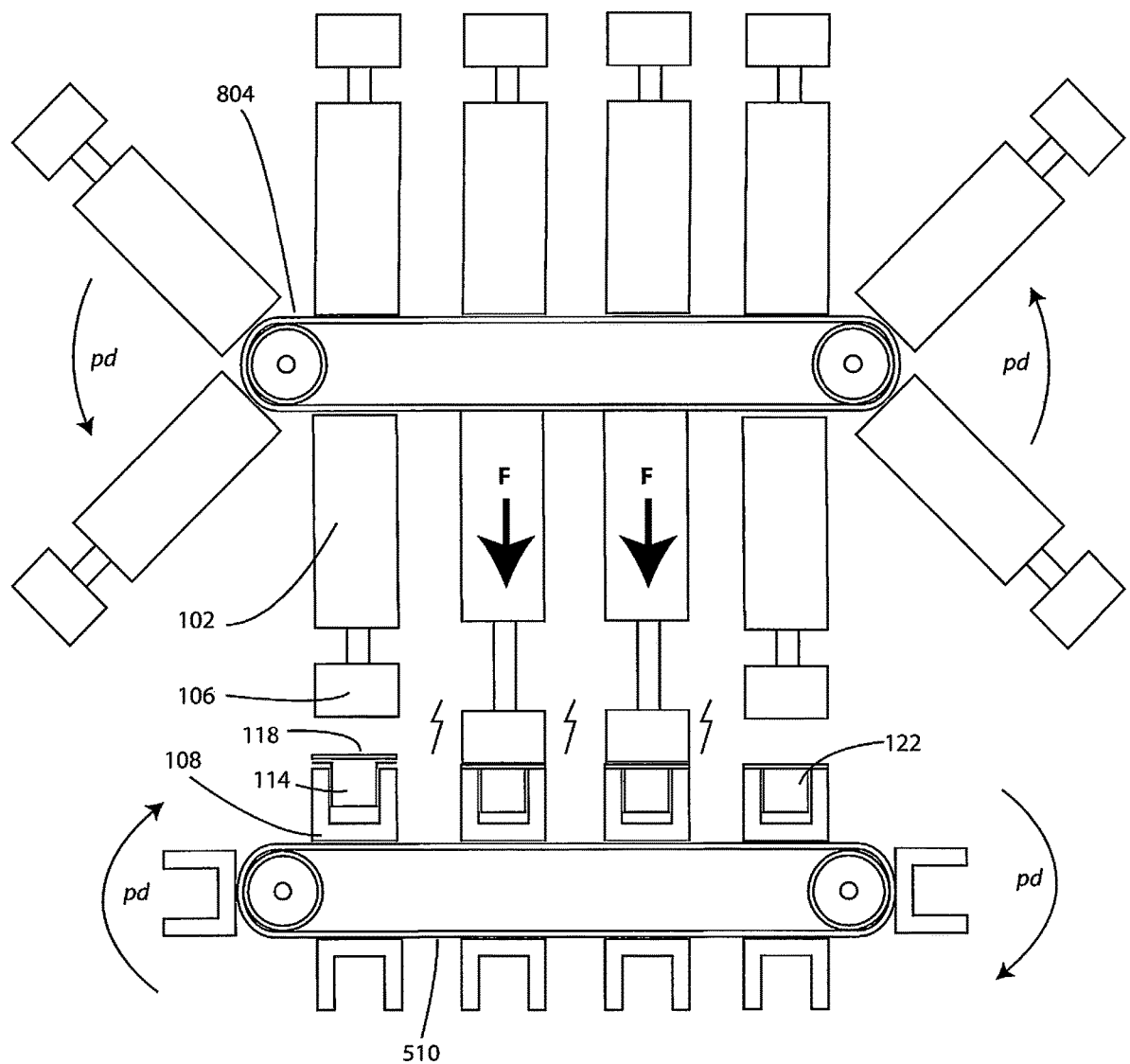
FIG. 8 is a schematic side view of a sealing system in accordance with various embodiments herein.

Referring now to FIG. 8, a schematic perspective view is shown of a sealing system 800 in accordance with various embodiments herein. The sealing system 800 is configured to ultrasonically join components in a manner functionally consistent with the various sealing systems described above and can thus incorporate many similar elements. The sealing system 800 includes a plurality of ultrasonic stacks 102 consistent with the various ultrasonic stacks described herein. Each ultrasonic stack 102 can be mounted on a sonotrode conveyor 804. The sonotrode conveyor 804 can operate continuously or intermittently in a processing directionpd. The sealing system 800 includes a plurality of anvils 108 consistent with the various anvils described herein. The anvils can be mounted on a conveyor 510. The conveyor 510 can operate continuously or intermittently in a processing direction pd. The sealing system 800 can include a container supply mechanism for supplying containers 114 to the anvils 108. The sealing system 700 can include a lid supply mechanism for supplying lids 118 to the containers 114 disposed on the anvils 108. The system can further include a removing mechanism for removing sealed containers 122 from each anvil 108 of the system 700.

The sonotrode platform 104 can be configured as a conveyor for conveying ultrasonic stacks 102. Each ultrasonic stack 102 can move around the sonotrode platform 104 in a closed circuit having a sealing path portion, the mounting structures 704 moving continuously or intermittently in a processing direction pd. At the sealing path portion, the sonotrode 106 of each ultrasonic stack 102 can align with a corresponding anvil 108. At the sealing path portion, each sonotrode 106 can move in a reciprocating motion between a release position distant from a corresponding anvil 108 and a compressing position proximal to the corresponding anvil 108, each sonotrode 106 being energized at the compressing position. Energized sonotrodes 106 at the compressing position can be used to ultrasonically join components, such as a container 114 and a lid 118.

Containers and Lids

The container embodiments herein can be used for many applications in addition to microwavable food containers discussed above. In some embodiments, the ultrasonic sealing systems and methods disclosed herein can be used to create an easy-open container for hot and cold (human or pet) foods, beverages, retort containers, cosmetics, paint containers, automotive products, and the like. In some embodiments, the containers can be used for packaging foods such as soups, beverages, sauces, cookies, crackers, bread, and the like. In some embodiments, the ultrasonic sealing systems and methods disclosed herein can be used to create an ultrasonic weld between a lid and container during or after any of a high pressure processing, hot fill processing, cold fill processing, and the like. In some embodiments, the ultrasonic sealing processes described herein can be used to create a hermetic seal within a container. In some embodiments, the container and lid are designed to fit together by way of a friction fit, snap fit, engagement thread, or other dimensional fit in addition to an ultrasonic bond.

The lid and cup can ideally be formed from the same polymer so that they both have the same melt flow index and are therefore compatible with each other during the ultrasonic welding process. In some embodiments, the polymer composition of the lid and the polymer composition of the cup can be different if they have substantially similar melt flow indices. The lids and containers discussed herein can be created from polymers including, but not limited to polycarbonates, polyvinylchlorides, polyethylenes, polyethylene terephthalates, polypropylenes, and polyamides. As discussed above, the polymeric containers discussed herein can contain substantially no metal content. Such containers offer a microwave-friendly design. Polymers such as those suitable for use herein have little to no dielectric influence on the microwave heating of the product inside the container. Thus, the containers can be compatible with various electromagnetic wave food processing systems. Additionally, containers having substantially no metal content can be recycled using a single-stream recycling system, with no need to separate the components from one another.

A hermetic seal can be created between containers and lids through the ultrasonic sealing systems and methods disclosed herein. A seal can be formed between a polymeric lid and a polymeric cup. An ultrasonic weld between a polymeric ring of a lid and a polymeric top edge of a cup can be actuated through an energy director bead integral to either the polymeric ring or the polymeric top edge of the cup. The energy director bead can have a shape designed to initiate meltflow between components. The energy director bead can have a variety of shapes. In some embodiments, the energy director bead can have a pyramidal or triangular shape.

The multi-head rotary ultrasonic systems and methods disclosed herein can be used to ultrasonically weld materials other than food containers and container lids. The products that can be processed by the systems and methods herein can include any product or component that can be formed by ultrasonic welding in a continuous production process.

Ultrasonic Parameters

The ultrasonic vibrations applied by the sonotrodes of the systems disclosed herein can be applied at a certain frequency. A sonotrode can be configured to vibrate at a frequency within a range, wherein the upper and lower bounds of the range can be defined by any combination of the following frequencies: 1 kHz, 5 kHz, 10 kHz, 15 kHz, 20 kHz, 22 kHz, 24 kHz, 26 kHz, 28 kHz, 30 kHz, 32 kHz, 32 kHz, 34 kHz, 36 kHz, 38 kHz, 40 kHz, 50 kHz, 60 kHz, 75 kHz, and 100 kHz.

The ultrasonic vibrations applied by the sonotrodes of the systems disclosed herein can be applied at a certain amplitude. A sonotrode can be configured to vibrate at an amplitude within a range, wherein the upper and lower bounds of the range can be defined by any combination of the following amplitudes: 1 micron, 2 microns, 5 microns, 10 microns, 15 microns, 20 microns, 25 microns, 30 microns, 35 microns, 40 microns, 45 microns, 50 microns, 55 microns, 60 microns, 65 microns, 70 microns, 75 microns, 80 microns, 85 microns, 90 microns, 95 microns, 100 microns, 250 microns, 500 microns, and 1000 microns.

A sonotrode can be configured to apply a certain force to a container or other object to be welded, sealed, or otherwise joined. A sonotrode can be configured to apply a force within a range, wherein the upper and lower bounds of the range can be defined by any combination of the following forces: 0.5 lbf, 1 lbf, 2 lbf, 3 lbf, 4 lbf, 5 lbf, 10 lbf, 20 lbf, 30 lbf, 40 lbf, 50 lbf, 60 lbf, 70 lbf, 80 lbf, 90 lbf, 100 lbf, 120 lbf, 140 lbf, 160 lbf, 180 lbf, 200 lbf, 220 lbf, 240 lbf, 260 lbf, 280 lbf, 300 lbf, 320 lbf, 340 lbf, 360 lbf, 380 lbf, 400 lbf, 420 lbf, 440 lbf, 460 lbf, 480 lbf, 500 lbf, and 750 lbf.

A sonotrode stack or assembly can be configured to apply a certain pressure to a container or other object to be welded, sealed, or otherwise joined. A sonotrode stack can be configured to apply a pressure within a range, wherein the upper and lower bounds of the range can be defined by any combination of the following pressures: 0.5 psi, 1 psi, 2 psi, 3 psi, 4 psi, 5 psi, 10 psi, 15 psi, 20 psi, 25 psi, 30 psi, 35 psi, 40 psi, 45 psi, 50 psi, 55 psi, 60 psi, 65 psi, 70 psi, 75 psi, 80 psi, 85 psi, 90 psi, 100 psi, 105 psi, 110 psi, 115 psi, 120 psi, 130 psi, 140 psi, 150 psi, 200 psi, 500 psi, and 1000 psi.

A converter can be provided with a certain amount of electrical power to produce ultrasonic vibrations. A converter can be supplied power within a range, wherein the upper and lower bounds of the range can be defined by any combination of the following powers: 100 W, 200 W, 300 W, 400 W, 500 W, 600 W, 700 W, 800 W, 900 W, 1000 W, 1100 W, 1200 W, 1300 W, 1400 W, 1500 W, 1600 W, 1700 W, 1800 W, 1900 W, 2000 W, 2250 W, 2500 W, 2750 W, 3000 W, 4000 W, and 5000 W.

A container or other object can be ultrasonically welded for a certain exposure period. An ultrasonic welding process can be undergone for an exposure time within a range, wherein the upper and lower bounds of the range can be defined by any combination of the following exposure times: 0.01 s, 0.1 s, 0.2 s, 0.3 s, 0.4 s, 0.5 s, 0.6 s, 0.7 s, 0.8 s, 0.9 s, 1.0 s, 1.1 s, 1.2 s, 1.3 s, 1.4 s, 1.5 s, 1.6 s, 1.7 s, 1.8 s, 1.9 s, 2.0 s, 2.5 s, 3.0 s, 4.0 s, 4.5 s, 5.0 s, 5.5 s, 6 s, 6.5 s, 7.0 s, 7.5 s, 8.0 s, 8.5 s, 9.0 s, 9.5 s, 10 s, 11 s, 12 s, 13 s, 14 s, 15 s, 16 s, 17 s, 18 s, 19 s, 20 s, 25 s, 30 s, 60 s, and greater than 60 s. In some embodiments, the exposure time is from about 0.1 s to about 2.0 s.

In the various drawings herein, sealing systems have been shown with varying numbers of ultrasonic stacks. The number of ultrasonic stacks in a sealing system is not particularly limited. An ultrasonic sealing system can have a number of ultrasonic stacks within a range, wherein the upper and lower bounds of the range can be defined by any combination of the following numbers: 1 ultrasonic stack, 2 ultrasonic stacks, 3 ultrasonic stacks, 4 ultrasonic stacks, 5 ultrasonic stacks, 6 ultrasonic stacks, 7 ultrasonic stacks, 8 ultrasonic stacks, 9 ultrasonic stacks, 10 ultrasonic stacks, 11 ultrasonic stacks, 12 ultrasonic stacks, 13 ultrasonic stacks, 14 ultrasonic stacks, 15 ultrasonic stacks, 16 ultrasonic stacks, 17 ultrasonic stacks, 18 ultrasonic stacks, 19 ultrasonic stacks, 20 ultrasonic stacks, and greater than 20 ultrasonic stacks.

Feedback Mechanisms

During ultrasonic sealing, sensors disposed on the ultrasonic stack or other components of a sealing system can be used to provide data for a closed-loop feedback process. The ultrasonic welding process can result in a dimensional change in the height of the final ultrasonic weld as compared to the individual lid and cup components prior to ultrasonic weld formation. A force sensor and displacement sensor can be used to maintain a desired force while by selectively moving the sonotrode to compensate for dimensional changes.

A displacement sensor can determine the initial make up height of a sonotrode before welding begins. The initial make up height of a sonotrode can be used to determine whether components are misplaced on an anvil, and thus in some embodiments prevent the sonotrode from being energized if proper conditions are not met. For example, if the distance between a sonotrode and anvil is lower than expected, the feedback mechanism could determine that a container, lid, or both are not present on the anvil. Similarly, if the distance between a sonotrode and anvil is higher than expected, the feedback mechanism could determine that a container or lid are improperly seated, or that an extra container or lid is present on the anvil. In such cases, the feedback mechanism could prevent the sonotrode from being energized and prevent possible damage or machine jamming.

The change between the final ultrasonic weld height as compared to the height of the individual components prior to weld formation can be used as a measure of weld quality and to validate seal integrity. During welding, a displacement sensor can be used to provide weld quality information to a control station. The control station can adjust the power and time of exposure to the sonotrode to create a final ultrasonic weld having optimal strength and seal integrity as required for the intended application. Thus, the sonotrode can be used as an intelligent feedback mechanism to detect the quality of the final ultrasonic weld. Any ultrasonic welds that do not meet a threshold height can be rejected and removed for further inspection and system optimization.

Throughput Rate

An ultrasonic sealing system can be configured to ultrasonically weld, join, or seal objects with at a certain throughput rate. In some embodiments, a sealing system has a throughput rate within a range, wherein the upper and lower bounds of the range can be defined by any combination of the following throughput rates: 1 sealed object per minute, 25 sealed objects per minute, 50 sealed objects per minute, 100 sealed objects per minute, 150 sealed objects per minute, 200 sealed objects per minute, 250 sealed objects per minute, 300 sealed objects per minute, 400 sealed objects per minute, 500 sealed objects per minute, 600 sealed objects per minute, 750 sealed objects per minute, 1000 sealed objects per minute, 1500 sealed objects per minute, 2000 sealed objects per minute, 2500 sealed objects per minute, 3000 sealed objects per minute, 4000 sealed objects per minute, or 5000 sealed objects per minute.

The embodiments described herein are not intended to be exhaustive or to limit the invention to the precise forms disclosed in the following detailed description. Rather, the embodiments are chosen and described so that others skilled in the art can appreciate and understand the principles and practices. Therefore, it should be understood that many variations and modifications may be made while remaining within the spirit and scope herein.

All publications and patents mentioned herein are hereby incorporated by reference. The publications and patents disclosed herein are provided solely for their disclosure. Nothing herein is to be construed as an admission that the inventors are not entitled to antedate any publication and/or patent, including any publication and/or patent cited herein.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration to. The phrase "configured" can be used interchangeably with other similar phrases such as arranged and configured, constructed and arranged, constructed, manufactured and arranged, and the like.

The invention claimed is:

1. A system for sealing lids onto containers comprising:
   a rotating platform;
   a plurality of receptacles mounted to the platform;

a plurality of sonotrodes mounted to the platform, each sonotrode corresponding to a receptacle, each sonotrode comprising a displacement sensor to determine a position of each sonotrode relative to each corresponding receptacle;

wherein each sonotrode moves in a reciprocating motion between a release position distant from a corresponding receptacle and a compressing position proximal to the corresponding receptacle, the compressing position occurring at a first angular position of the platform; and wherein each sonotrode is energized at the compressing position.

2. The system of claim 1, each sonotrode configured to ultrasonically weld a container and a lid together at the compressing position, wherein ultrasonic welding occurs at a rate of 300 containers per minute to 600 containers per minute.

3. The system of claim 1, each sonotrode comprising a feedback mechanism for determining a welding parameter.

4. The system of claim 1, the platform comprising a slip ring for providing electrical communication between each sonotrode and a power supply.

5. The system of claim 1, each receptacle comprising a clasp mechanism for receiving a container.

6. The system of claim 1, each sonotrode configured to vibrate at a frequency of about 20 kHz to about 35 kHz when energized.

7. The system of claim 1, each receptacle configured to receive a container at a second angular position of the platform.

8. The system of claim 7, each receptacle configured to eject a container at a third angular position of the platform.

9. A method for sealing lids onto containers comprising:

disposing a container on a receptacle, the receptacle mounted to a rotatable platform;

rotating the rotatable platform, the rotatable platform comprising a sonotrode disposed adjacent to the receptacle;

moving the sonotrode in a reciprocating motion between a release position distant from the receptacle and a compressing position proximal to the receptacle, the compressing position occurring at a first angular positon of the rotatable platform;

energizing the sonotrode at the compressing position;

determining the position of the sonotrode relative to the receptacle using a displacement sensor.

10. The method of claim 9, wherein welding occurs at a rate of 300 containers per minute to 600 containers per minute.

11. The method of claim 9, the rotatable platform comprising a slip ring for providing electrical communication between the sonotrode and a power supply.

12. The method of claim 9, further comprising the receptacle receiving a container at a second angular position of the rotatable platform.

13. The method of claim 12, further comprising the receptacle ejecting a container at a third angular position of the rotatable platform.

* * * * *

UNITED STATES PATENT AND TRADEMARK OFFICE
CERTIFICATE OF CORRECTION

PATENT NO. : 11,312,085 B2
APPLICATION NO. : 17/170432
DATED : April 26, 2022
INVENTOR(S) : Mark Robert Watts It is certified that error appears in the above-identified patent and that said Letters Patent is hereby corrected as shown below:

In the Claims

Claim 9, Column 18, Lines 12-13, "positon" should read --position--.

Signed and Sealed this
Fourteenth Day of March, 2023

*Katherine Kelly Vidal*

Katherine Kelly Vidal
*Director of the United States Patent and Trademark Office*